(12) United States Patent
Hess et al.

(10) Patent No.: US 9,714,320 B2
(45) Date of Patent: Jul. 25, 2017

(54) PROCESS FOR PREPARING A HIGH MOLECULAR WEIGHT HETEROAROMATIC POLYESTER OR COPOLYESTER

(71) Applicant: UHDE INVENTA-FISCHER GMBH, Berlin (DE)

(72) Inventors: Christopher Hess, Schoenfliess (DE); Caspar Paetz, Berlin (DE)

(73) Assignee: UHDE INVENTA-FISCHER GMBH, Berlin (DE)

( * ) Notice: Subject to any disclaimer, the term of this patent is extended or adjusted under 35 U.S.C. 154(b) by 0 days.

(21) Appl. No.: 14/460,939

(22) Filed: Aug. 15, 2014

(65) Prior Publication Data

US 2014/0357808 A1 Dec. 4, 2014

Related U.S. Application Data

(63) Continuation of application No. PCT/EP2013/053065, filed on Feb. 15, 2013.

(30) Foreign Application Priority Data

Feb. 17, 2012 (DE) .......................... 10 2012 003 417

(51) Int. Cl.
| | |
|---|---|
| C08G 63/12 | (2006.01) |
| C08G 63/78 | (2006.01) |
| C08G 63/85 | (2006.01) |
| C08G 63/91 | (2006.01) |
| C08G 63/181 | (2006.01) |
| C08G 63/685 | (2006.01) |
| C08G 63/688 | (2006.01) |
| C08G 63/80 | (2006.01) |

(52) U.S. Cl.
CPC ........... *C08G 63/12* (2013.01); *C08G 63/181* (2013.01); *C08G 63/6856* (2013.01); *C08G 63/6886* (2013.01); *C08G 63/78* (2013.01); *C08G 63/80* (2013.01); *C08G 63/85* (2013.01); *C08G 63/914* (2013.01); *C08G 2230/00* (2013.01)

(58) Field of Classification Search
None
See application file for complete search history.

(56) References Cited

U.S. PATENT DOCUMENTS

| | | | | |
|---|---|---|---|---|
| 3,321,444 A * | 5/1967 | Keil | ..................... | C08G 63/826 |
| | | | | 502/170 |
| 3,542,731 A * | 11/1970 | Culbertson | ........ | C08G 63/6852 |
| | | | | 524/233 |
| 4,654,413 A * | 3/1987 | Takahashi | ............ | C08G 63/183 |
| | | | | 528/274 |
| 5,292,865 A * | 3/1994 | Kerpes | ................... | C08G 63/90 |
| | | | | 528/492 |
| 5,408,035 A * | 4/1995 | Duh | ....................... | C08G 63/80 |
| | | | | 528/272 |
| 5,434,239 A | 7/1995 | Bhatia | | |
| 6,984,694 B2 * | 1/2006 | Blasius, Jr. | ........... | C08F 220/32 |
| | | | | 525/123 |
| 2005/0163679 A1 * | 7/2005 | | | Schulz Van |
| | | Endert | ................. | B01J 19/1887 |
| | | | | 528/271 |
| 2006/0287472 A1 * | 12/2006 | Jernigan | ................ | C08G 63/78 |
| | | | | 528/272 |
| 2009/0117013 A1 * | 5/2009 | Schulz Van Endert | .. | B01J 19/18 |
| | | | | 422/135 |
| 2011/0039999 A1 | 2/2011 | Witt et al. | | |
| 2011/0124839 A1 | 5/2011 | Matsuda | | |

FOREIGN PATENT DOCUMENTS

| | | |
|---|---|---|
| CN | 1298416 A | 6/2001 |
| CN | 101460242 A | 6/2009 |
| CN | 101899145 A | 12/2010 |
| CN | 102079854 A | 6/2011 |
| DE | 19537930 A1 | 4/1997 |
| DE | 102006025942 | 12/2007 |
| EA | 200870189 A1 | 2/2009 |
| EP | 2327742 | 6/2011 |

(Continued)

OTHER PUBLICATIONS

Database WPI, Week 200901, Thomson Scientific, London, GB, AN 2009-A17075, XP002706061, dated Dec. 4, 2008, 4 pages.
M. Jiang, J. Pol. Sci. Part A: Polymer Chemistry, vol. 50, dated Dec. 7, 2011, pp. 1026-1036.
PCT Application No. PCT/EP2013/053065, International Search Report and Written Opinion, dated Sep. 8, 2013, 7 pages.
Kang Jin Seo, Myeong Jun Kim et al: Polymerization and Characterization of Polyesters Using Rufan Monomers from Biomass, Polymer (Korea), vol. 35, No. 6, pp. 526-530, 2011.
Russian Appl. No. 2014132207, Office Action dated Dec. 9, 2016.
PCT Application No. PCT/EP2013/053065, International Search Report dated Feb. 20, 2014.

*Primary Examiner* — Christopher M Rodd
(74) *Attorney, Agent, or Firm* — Lathrop & Gage L.L.P.

(57) ABSTRACT

A process for preparing a high molecular weight heteroaromatic polyester or copolyester is disclosed. A process for preparing a high molecular weight heteroaromatic polyester or copolyester includes the steps of: (a) processing comonomers by mixing together to form a homogeneous solution (1) at least one heteroaromatic dicarboxylic acid having 2-12 carbon atoms or a diester or an acid anhydride derived therefrom, or a mixture thereof; (2) at least one alcohol having 2 to 12 carbon atoms and at least two hydroxyl functionalities; and (3) optionally aromatic or aliphatic dicarboxylic acids or diesters or acid anhydrides derived therefrom; (b) converting the paste/solution obtained in step a) into an esterification product containing at least one diester or at least one oligoester formed from the at least one heteroaromatic dicarboxylic acid and the at least one alcohol; and (c) polycondensing/copolycondensing the reaction product obtained from step b) under reduced pressure.

18 Claims, No Drawings

(56) References Cited

FOREIGN PATENT DOCUMENTS

| | | |
|---|---|---|
| JP | 2008291244 | 4/2008 |
| RU | 2275236 C2 | 4/2006 |
| WO | 2007052847 | 5/2007 |
| WO | 2009135921 A1 | 11/2009 |
| WO | 2010077133 A1 | 7/2010 |

\* cited by examiner

PROCESS FOR PREPARING A HIGH MOLECULAR WEIGHT HETEROAROMATIC POLYESTER OR COPOLYESTER

RELATED APPLICATIONS

This application is a continuation of International Application Number PCT/EP2013/053065, filed Feb. 15, 2013, which claims priority to German Patent Application 10 2012 003 417.2, filed Feb. 17, 2012, the contents of both are incorporated by reference in their entirety.

BACKGROUND

Different polymers for various applications have been known for many decades in the prior art. Polyolefins, polyesters, polyamides, polyacrylates, or polycarbonates may be mentioned here by way of example. The selection of these different polymeric materials depends in general on the intended purpose and the desired mechanical properties, for example impact strength or heat resistance.

However, these polymeric materials are problematic in that the reactants used to prepare such polymers (for example terephthalic acid and isophthalic acid, used as aromatic building blocks for polyesters) come from synthetic sources. The biodegradability of the resulting polyesters is also insufficient. There is accordingly an immense demand in the marketplace for polymeric materials, especially polyesters, where reactants used for preparing the polyesters are essentially obtained from renewable raw materials, and the resulting polyesters are biodegradable. There has hitherto been no shortage of attempts to synthesize such polyesters from renewable raw materials. Examples include polylactide as well as polyesters based on furan-2,5-dicarboxylic acid.

WO 2010/077133 A1 discloses a process for preparing polymers obtained on the basis of 2,5-furandicarboxylic acid and diols/polyols. The process proposes a first step of forming a prepolymer (or "monomer") from the aforementioned reactants and a subsequent, second step of conducting a polycondensation. With regard to the first step, WO 2010/077133 A1 proposes transesterifying a mixture of 2,5-furandicarboxylate with a diol. The transesterification is carried out using a tin catalyst. The polycondensation is proposed to be carried out under reduced pressure, again in the presence of a tin catalyst.

However, the attainable molecular weight and physical properties (for example, impact strength) of these prior art heteroaromatic polyesters, still fail to meet the expected standards of other prior art polyesters (for example, those formed from terephthalic acid and diols). Moreover, this process is only carried out in individual batches ("batchwise") which generally result in varied product quality from batch to batch, resulting in an inhomogeneous mixed product obtained therefrom.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented below.

In one embodiment, a continuous process for preparing a high molecular weight heteroaromatic polyester or copolyester comprising the steps of: (a) processing comonomers by mixing together to form a paste or by mixing under elevated temperature to form a homogeneous solution (1) at least one heteroaromatic dicarboxylic acid having 2-12 carbon atoms or a diester or an acid anhydride derived therefrom, or a mixture thereof;
(2) at least one alcohol having 2 to 12 carbon atoms and at least two hydroxyl functionalities; and (3) optionally further aromatic or aliphatic dicarboxylic acids or diesters or acid anhydrides derived therefrom; (b) converting the paste/solution obtained in step a) into an esterification product, the esterification product containing at least one diester or at least one oligoester formed from the at least one heteroaromatic dicarboxylic acid and the at least one alcohol; and (c) polycondensing/copolycondensing the reaction product obtained from step b) under reduced pressure compared with standard conditions. Step c) further includes the substeps ($c_1$) obtaining a polyester prepolymer/copolyester prepolymer by polycondensation/copolycondensation from the reaction product obtained from step b); and ($c_2$) obtaining the polyester/copolyester from the polyester prepolymer/copolyester prepolymer of step $c_1$) by polycondensation/copolycondensation.

DETAILED DESCRIPTION

The invention relates to a continuous process for preparing a high molecular weight heteroaromatic polyester or copolyester in three or more steps. A first step of the process includes preparing a paste (or a homogeneous solution) from reactants that may include (1) at least one heteroaromatic dicarboxylic acid, diester, or anhydride and (2) at least one alcohol at an elevated temperature. This paste (or, as the case may be, solution) is converted in a second step into a prepolymer (monomer) which, in the third step of the process, is polycondensed or copolycondensed under reduced pressure compared with standard conditions.

One object of the present invention to propose a large-scale industrial continuous process for preparing high molecular weight heteroaromatic polyesters, and in particular, polyesters based on 2,5-furandicarboxylic acid. Use of 2,5-furandicarboxylic acid may result in heteroaromatic polyesters which, in terms of their mechanical and physical properties, are distinctly improved over the prior art. Furthermore, the continuous method of preparation as described herein may aid in the achievement of heteroaromatic polyesters exhibiting a high level of product consistency.

According to one embodiment of the present invention, a process for preparing a high molecular weight heteroaromatic polyester/copolyester in three or more steps with the third step—the polycondensation step—being carried out as two sub-steps.

The specific form of executing the polycondensation in the process according to the present invention may thus be an essential element of the present invention. The invention proposes that the polycondensation be carried out in two steps wherein, in Step C1, the esterification/transesterification product of the second step (Step B) is transformed into a polyester prepolymer or into a copolyester prepolymer. This prepolymer is then converted in Step C2 to the polyester or copolyester by polycondensation or copolycondensation, respectively.

The polyester obtained according to the process of the present invention may preferably be pellet form after cooling. The pellets may then be readily processable via molding tools known in the prior art, such as extruder or injection molds, to give molded articles.

The following reactants may be preferred in the process of the present invention:

a) at least one heteroaromatic dicarboxylic acid selected from the group consisting of 2,5-furandicarboxylic acid, 3,4-furandicarboxylic acid, 2,4-furandicarboxylic acid, 2,3-furandicarboxylic acid, 2,5-pyrroledicarboxylic acid, 2,5-thiophenedicarboxylic acid, pyrazole-3,5-dicarboxylic acid, oxazole-2,5-dicarboxylic acid, thiazole-2,5-dicarboxylic acid, oxazole-2,5-dicarboxylic acid, thiazole-2,5-dicarboxylic acid and/or combinations or mixtures thereof, and b) at least one alcohol selected from the group consisting of ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,7-heptanediol, 1,8-octanediol, 1,9-nonanediol, neopentyl glycol, 1,4-cyclohexanedimethanol and/or combinations or mixtures thereof.

The process of the present invention will now be more particularly described with regard to the individual steps.

In a first step (Step A) of the continuous process for preparing a high molecular weight heteroaromatic polyester or copolyester, at least one heteroaromatic dicarboxylic acid (or the diester or an acid anhydride of a heteroaromatic dicarboxylic acid having 2 to 12 carbon atoms) and at least one alcohol having 2 to 12 carbon atoms and at least two hydroxyl functionalities may be mixed to form a paste. Alternately, the reactants may be mixed under an elevated temperature to form a homogeneous solution. Optionally aromatic and/or aliphatic dicarboxylic acids (or diesters or acid anhydrides derived therefrom) may be additionally included in the mixture.

Preferably, the stoichiometric ratio of the totality of the at least one heteroaromatic dicarboxylic acid (and/or the diesters or acid anhydrides derived therefrom, having 2 to 12 carbon atoms) to the totality of the at least one alcohol having 2 to 12 carbon atoms is in the range from 1:0.5 to 1:5.0, preferably from 1:0.9 to 1:3.0, more preferably from 1:1.1 to 1:2.0. The temperatures set for process step a) are preferably in the range from 10 to 250° C. and more preferably between 50 and 180° C.

The mixture obtained in Step A is then subjected to an esterification/transesterification process in Step B resulting in a product containing the diester and oligomers formed from the at least one heteroaromatic dicarboxylic acid and the at least one alcohol with on average 2 to 10, preferably 3 to 6 repeat units. The esterification/transesterification process (Step B) may be carried out, for example, in a hydrocyclone having an externally disposed heat exchanger.

Preferably, the esterification/transesterification product of Step B contains the diester at not less than about 10 wt %, preferably from about 20 to 98 wt %, more preferably from about 40 to 95 wt %, and yet more preferably from about 60 to 90 wt %. The weight ratio of the Step B esterification product to total feed paste or solution (comprising at least one heteroaromatic dicarboxylic acid having 2 to 12 carbon atoms and/or its acid anhydrides or diesters with the at least one aliphatic alcohol having 2 to 12 carbon atoms and at least two hydroxyl functionalities) may be in the range from about 1:0.2 to about 1:10, and preferably from about 1:0.5 to about 1:2. It may be advantageous at Step B of the process to have a set a stoichiometric ratio for the totality of the at least one dicarboxylic acid (and/or acid anhydrides derived therefrom) to the totality of the at least one alcohol having 2 to 12 carbon atoms, wherein the ration is in the range from about 1:0.5 to about 1:5.0, preferably from about 1:0.9 to about 1:3.0, and more preferably from about 1:1.1 to about 1:2.0.

Preferred temperatures for conducting process Step B may be temperatures of 120 to 300° C., and may preferably be temperatures of 160 to 250° C. Preferred pressures in process Step B may be moderate subatmospheric pressure, atmospheric pressure, or superatmospheric pressure, and in particular, pressures of approximately 0.9 to 3 bar.

In a further embodiment, byproducts which at standard conditions are in vapor form at 60° C. or above (for example, water or methanol) are at least partially or entirely removed during Step B and/or following Step B.

When the process is carried out as described above, the reaction product obtained in Step B may have an intrinsic viscosity (IV) of about 0.04 dl/g to 0.12 dl/g, preferably of about 0.05 dl/g to 0.10 dl/g and more preferably of about 0.06 dl/g to 0.08 dl/g.

The process then moves to Step C, the polycondensation/copolycondensation process. Step C may be performed in two sub-steps C1, and C2. In sub-step C1 the esterification/transesterification product of the second step (Step B) is transformed into a polyester prepolymer or into a copolyester prepolymer. One apparatus which has proved advantageous for the polycondensation and specifically for process Step C1(i.e., for preparing the prepolymer) is a falling film cascade under removal of condensation products and/or volatile byproducts. It shall be noted that the hydrocyclone (from Step B) and the falling film cascade can also be combined into a single reactor. A reactor of this type is more particularly described in EP 1 678 236 A1.

It may be particularly advantageous for Step C1 to be carried out at pressures of about 0.1 to 2 bar, preferably about 0.15 bar to 1 bar and more preferably about 0.2 to 0.7 bar and at temperatures of approximately 160 to 300° C., and preferably at temperatures of approximately 200 to 260° C.

In sub-step C2,the polyester prepolymer or copolyester prepolymer is converted to the polyester or copolyester via polycondensation or copolycondensation, respectively. In one advantageous embodiment for the polycondensation, step c2) is carried out in a cage reactor under rapid and high-efficiency removal of condensation products and volatile byproducts. Cage reactors such as those described in EP 0 719 582 B1 may be particularly advantageous here.

When the process is carried out as described above, the reaction product obtained in Step C2 may have an intrinsic viscosity (IV) of about 0.8 dl/g to 1.6 dl/g.

Step C2 may advantageously be carried out under reduced pressure compared with standard conditions, preferably at a pressure between about 0.1 mbar and 30 mbar, more preferably between about 0.2 mbar and 10 mbar, and even more preferably between about 0.4 mbar and 5 mbar, and at temperatures of approximately 200 to 300° C., and more preferably approximately 220 to 270° C.

In relation to the catalysts used, which may be used in Step B and/or in Step C of the process according to the present invention, preference may be given to using a catalyst which is heavy metal free. WO 2010/077133 A1 discloses using a tin catalyst, which contains heavy metal. Catalysts of this type should ideally be avoided in the process of the present invention. In one preferred embodiment, therefore, the process of the present invention encompasses any known catalyst with the exception of tin catalysts.

Preferred catalysts for use in the process of the present invention may be titanium-containing catalysts, especially titanium alkoxides and/or titanium salts derived from organic acids, e.g., titanium oxalate, titanium citrate and/or titanium lactate. Preference may be further given to antimony-containing catalysts such as antimony acetate.

The catalyst may be admixed in Step B, preferably at a mass concentration of 10 to 20,000 ppm, and more preferably of 100 to 5,000 ppm, based on the total weight of heteroaromatic dicarboxylic acid, alcohol and esterification product. On admixture into the final Step C, the same concentrations are preferred, i.e., mass concentrations of 10 to 20,000 ppm, and more preferably of 1,000 to 5,000 ppm, based on the reaction product obtained from Step B.

The invention further contemplates embodiments wherein at least one cocatalyst or at least one stabilizer is also added to the reaction mixture, in particular to the prepolymer and/or polymer, during Steps B and/or C. Additives may further be present as known in the prior art in addition to cocatalysts and stabilizers. The following additives may be mentioned by way of example: heat stabilizers, antioxidants, nucleating agents, flame retardants, antistats, processing aids, UV stabilizers and also reinforcing materials or fillers.

As known in the prior art from polyester chemistry, the reaction product from Step C may be subjected to a chain-extending step by admixture of 0.01 to 2 wt % based on the polymer mass of a reactive compound selected from the group of di- or polyfunctional epoxides, carbodiimides or diisocyanates.

The process of the present invention further provides that, when the intrinsic viscosity Step C is still insufficient for the planned applications, the reaction product obtained after Step C may be subjected to cooling down, conversion into a pellet and/or pulverulent form and also crystallization and then to a postcondensation in the solid state. These types of solid state postcondensations (SSPs) are known from polyester chemistry. The process conditions known there can also be employed for the postcondensation in relation to the heteroaromatic polyester obtained according to the present invention. Preferred temperatures for the solid state postcondensation of the polyesters described range from 160 to 210° C.

The postcondensation process is carried out, as known in the prior art, by passing a dried inert gas through a suitable reactor countercurrently to the pellets. The inert gas used may be an inert gas such as nitrogen, carbon dioxide, and/or argon. The solid state postcondensation (SSP) may be carried out with preference at a pressure level of about 0.001 to 0.2 bar in the stated temperature range.

The pellets and/or powders obtained after Step C may also be after-treated by freeing the pellets and/or the powder from volatile reaction products (e.g., acetaldehyde, methyldioxolane, acrolein, water, or tetrahydrofuran). The freeing from these byproducts may be effected by a gas stream, such as air, nitrogen, or $CO_2$ (or a mixture thereof) having a dew point of approximately −100° C. to 10° C., more preferably approximately −70° C. to −20° C., and at a temperature of approximately 100 to 200° C., and preferably approximately 150 to 180° C. It is similarly possible for the two steps of solid state postcondensation and the after-treatment to remove volatile compounds to be carried out in a conjoint step in the stated temperature range using the stated gases or gas mixtures or at sub-atmospheric pressure.

The two measures described above provide sustained improvement in the mechanical and physical properties of the pellets obtained and therefore also of the corresponding moldings.

The above-described process of the present invention provides high molecular weight heteroaromatic polyesters and/or copolyesters and may be very useful for preparing, in particular, polyethylene furanate or polybutylene furanate.

Preferred polyesters and/or copolyesters of the present invention contain about 1 mol % to 100 mol %, preferably about 50 mol % to 100 mol % (based on the sum total of feed) dicarboxylic acids of a heteroaromatic dicarboxylic acid, preferably 2,5-furandicarboxylic acid and the at least one diol component, preferably selected from the group ethylene glycol, propanediol or 1,4-butanediol.

In a further preferred embodiment of the polyester or copolyester of the invention, it contains from about 0.1% to 100% and more preferably between about 50% and 99% based on the sum total of all carbon atoms of such carbon atoms as are accessible from renewable sources, preferably by use of monomers from the group of biobased 2,5-furandicarboxylic acid or its ester, biobased succinic acid, biobased adipic acid, biobased sebacic acid, biobased ethylene glycol, biobased propanediol, biobased 1,4-butanediol, biobased isosorbide or biobased lactic acid.

A multiplicity of the copolyesters obtainable according to the invention are further characterized in that they contain at least one heteroaromatic dicarboxylic acid in an amount of about 20-80 mol %, preferably about 40-60 mol % and at least one aliphatic dicarboxylic acid in an amount of about 80-20 mol % and preferably of about 60-40 mol % (based on the sum of all dicarboxylic acids used) and are biodegradable according to European Standards for Biodegradability (EN 13432).

Embodiments of the present invention are described with the intent to be illustrative rather than restrictive. Alternative embodiments will become apparent to those skilled in the art that do not depart from its scope. A skilled artisan may develop alternative means of implementing the improvements without departing from the scope of the present invention. It will be understood that certain features and subcombinations are of utility and may be employed without reference to other features and subcombinations and are contemplated within the scope of the claims. While various objectives of the invention are set forth herein, an exhaustive listing of objectives has not been provided and the claims need not address one or more of the expressed objectives.

The invention will now be more particularly elucidated by means of an example.

EXAMPLE

Continuous Preparation of Polyethylene Furanate

A pilot plant (constructed as per EP 1 448 658 B1 and/or WO 2007/140925 A1) was used to first prepare a solution of dimethyl furandicarboxylate in ethylene glycol by placing 500 kg of dimethyl furandicarboxylate in a mixing vessel preheated to 120° C. This was followed by the addition of 290 kg of ethylene glycol (preheated to 80° C.) to the dimethyl furandicarboxylate over a period of 2 hours, at a uniform rate and under stirring, and under a stream of nitrogen.

After an additional 2 hours, all of the dimethyl furandicarboxylate had dissolved and the solution was drained into a reservoir vessel preheated to 100° C. From there the solution of dimethyl furandicarboxylate in ethylene glycol was continuously fed, by means of a metering pump, to an esterification/transesterification reactor.

The transesterification product underwent natural circulation in the esterification/transesterification reactor, and the temperature of the transesterification product was adjusted to a temperature of 230° C. via a heat exchanger. The transesterification was carried out under a pressure of 1000-1050 mbar.

The room temperature liquid catalyst, e.g., titanium tetrabutoxide, was metered into the esterification/transesterification step by means of a suitable metering pump, such that an active titanium content of 350 ppm was reached in the end product. Admixture and removal of transesterification product were controlled so as to obtain an average residence time in the transesterification step of 2 hours.

The methanol generated in the transesterification was withdrawn overhead and fed to a separating column. In the separating column, methanol was separated from ethylene glycol. The ethylene glycol removed at the base of the column was cooled down to a temperature of 80° C. and sent to an ethylene glycol stock reservoir tank.

The transesterification product withdrawn as bottoms of the transesterification step was transferred by means of a melt pump into the postesterification step. The feed in and out of the postesterification step are controlled so as to maintain an average residence time of 90 minutes in the postesterification step. The temperature in the postesterification step was 240° C., the prevailing pressure was 700 mbar.

The product removed as bottoms of the postesterification step was transferred by means of a melt pump into the prepolymerization step (Step C1). The feed in and out of the prepolymerization step are controlled so as to maintain an average residence time of 120 minutes in the prepolymerization step. The temperature in the prepolymerization step was 250° C., the prevailing pressure was 10 mbar.

The prepolymer withdrawn as bottoms of the prepolymerization step was transferred by means of a melt pump into the polycondensation reactor (Step C2). Feed in and out of the polycondensation reactor are controlled so as to maintain an average residence time of 90 minutes during the polycondensation. The temperature in the polycondensation step was 260° C., the prevailing pressure was 0.8 mbar.

The methanol residues and ethylene glycol vapors formed in the course of the polycondensation were likewise fed to the separating columns. The design of the polycondensation reactor corresponds to that described in EP 0718582B1.

The melt pump attached to the point of exit from the polycondensation reactor was used to transfer the melt to an underwater pelletization unit at a flow rate of 20 kg/h. After water had been whizzed off, polyethylene furanate pellets having an intrinsic viscosity value of 1.05 dL/g were obtained.

What is claimed is:

1. A continuous process for preparing a high molecular weight heteroaromatic polyester or copolyester comprising the steps of:
   a) processing comonomers by mixing together to form a paste or by mixing under elevated temperature to form a homogeneous solution:
      at least one heteroaromatic dicarboxylic acid having 2-12 carbon atoms or a diester or an acid anhydride derived therefrom, or a mixture thereof;
      at least one alcohol having 2 to 12 carbon atoms and at least two hydroxyl functionalities; and
      optionally further aromatic or aliphatic dicarboxylic acids or diesters or acid anhydrides derived therefrom;
   b) converting the paste/solution obtained in step a) into:
      $b_1$) an esterification product, the esterification product containing at least one diester or at least one oligoester formed from the at least one heteroaromatic dicarboxylic acid or an acid anhydride derived therefrom and the at least one alcohol; or
      $b_2$) a transesterification product, the transesterification product containing at least one diester or at least one oligoester formed from a diester and the at least one alcohol; and
   c) polycondensing/copolycondensing the reaction product obtained from step b) under reduced pressure compared with standard conditions;
   wherein:
      step c) further comprises:
         step $c_1$) obtaining a polyester prepolymer/copolyester prepolymer by polycondensation/copoly-condensation from the reaction product obtained from step b); and
         step $c_2$) obtaining the polyester/copolyester from the polyester prepolymer/copolyester prepolymer of step $c_1$) by polycondensation/copolycondensation; and
      the esterification/transesterification product of step b) contains the diester in an amount of about 20 to about 98 wt %; and
      the reaction product formed in step b) is standardized to an intrinsic viscosity (I.V.) in the range of about 0.05 dL/g to about 0.10 dL/g.

2. The process of claim 1, wherein:
step $c_1$) is carried out:
   i. at a pressure between the range of 0.1 bar to 0.7 bar; and
   ii. at a temperature between the range of 160 and 300° C.; and
step $c_2$) is carried out:
   iii. at a pressure between the range of 0.1 mbar and 30 mbar; and
   iv. at a temperature between the range of 200 and 300° C.

3. The process of claim 1, wherein:
   a) the at least one heteroaromatic dicarboxylic acid is selected from the group consisting of 2,5-furandicarboxylic acid, 3,4-furandicarboxylic acid, 2,4-furandicarboxylic acid, 2,3-furandicarboxylic acid, 2,5-pyrroledicarboxylic acid, 2,5-thiophenedicarboxylic acid, pyrazole-3,5-dicarboxylic acid, oxazole-2,5-dicarboxylic acid, thiazole-2,5-dicarboxylic acid, oxazole-2,5-dicarboxylic acid, thiazole-2,5-dicarboxylic acid, and combinations or mixtures thereof; and
   b) the at least one alcohol is selected from the group consisting of ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,7-heptanediol, 1,8-octanediol, 1,9-nonanediol, neopentyl glycol, 1,4-cyclohexane-dimethanol, and combinations or mixtures thereof.

4. The process of claim 1, wherein:
in step a) the stoichiometric ratio of the totality of the at least one heteroaromatic dicarboxylic acid, the diesters or acid anhydrides derived therefrom having 2 to 12 carbon atoms, or a mixture thereof, to the totality of the at least one alcohol having 2 to 12 carbon atoms is in the range from about 1:0.5 to about 1:5.0.

5. The process of claim 4, wherein the paste or solution is prepared in step a) at temperatures between the range of about 10° C. to about 250° C.

6. The process of claim 1, wherein the esterification/transesterification product of step b) contains a diester in an amount of about 60 to about 90 wt %.

7. The process of claim 6, wherein the esterification product of step b) additionally contains oligomers formed from the at least one heteroaromatic dicarboxylic acid and the at least one alcohol with approximately 2 to 10 repeat units.

8. The process of claim 6, wherein weight ratio of the esterification product of step b) to the total feed paste/solution of step a) is in the range from about 1:0.2 to about 1:10.

9. The process of claim 6, wherein the esterification product is prepared in step b) using a stoichiometric ratio in the range from about 1:0.5 to about 1:5.0 for the totality of the at least one dicarboxylic acid having 2 to 12 carbon atoms and acid anhydrides or diesters derived therefrom to the totality of the at least one alcohol having 2 to 12 carbon atoms.

10. The process of claim 1, wherein the reaction in step b) is carried out at temperatures of between about 120 to about 300° C.

11. The process of claim 1, wherein byproducts or condensation products, which at standard conditions are in vapor form from 60° C. or at higher temperatures, are at least partially or entirely removed during step b).

12. The process of claim 11, wherein at least one of step b) and step c) further comprises adding to the reaction mixture a catalyst comprising a titanium salt derived from an organic acid.

13. The process of claim 12, wherein the catalyst is admixed during at least one of:
  a) step b), at a mass concentration of about 100 to about 5,000 ppm, based on the total weight of heteroaromatic dicarboxylic acid, aliphatic alcohol and esterification product; and
  b) step c), at a mass concentration of about 100 to about 5,000 ppm, based on the reaction product obtained from step b).

14. The process of claim 1, wherein:
  a) the polyester formed in step $c_2$), is standardized to an intrinsic viscosity (I.V.) in the range of about 0.80 dL/g to 1.60 dL/g.

15. The process of claim 1, wherein at least one of a cocatalyst and a stabilizer is added to at least one of the prepolymer and the polymer either before or before and during the practice of step c).

16. The process of claim 15, wherein the reaction product of step c) is subjected to a chain-extending step by admixture of about 0.01 to about 2 wt %, based on the polymer mass, of a reactive compound selected from the group consisting of: di- or polyfunctional epoxides, carbodiimides and diisocyanates after step c).

17. The process of claim 15, wherein the reaction product obtained after step c) is subjected to the additional steps of:
  cooling down;
  converting the product into at least one of a pellet, pulverulent form, and crystallization form;
  postcondensing the product in the solid state in at least one of the following manners:
    at a temperature of between about 170-about 230° C. under a stream of an inert gas chosen from the group consisting nitrogen, carbon dioxide, and argon, or of a mixture thereof; and
    by reducing the pressure level compared with standard conditions to a pressure level of 0.01 to 0.2 bar.

18. The process of claim 15, further comprising the step of removing one or more volatile reaction byproducts under a stream of a gas having a dew point between the range of about −70° C. to about −20° C. at a temperature between the range of about 150° C. to about 180° C., wherein:
  the byproducts are selected from the group consisting of acetaldehyde, methyldioxolane, acrolein, water, and tetrahydrofuran; and
  the gas is selected from the group consisting of air, nitrogen, and carbon dioxide, or a mixture thereof.

* * * * *